United States Patent [19]

Hattersley et al.

[11] Patent Number: 5,341,485
[45] Date of Patent: Aug. 23, 1994

[54] MULTIPLE VIRTUAL ADDRESS TRANSLATION PER COMPUTER CYCLE

[75] Inventors: John R. Hattersley, Saugerties, N.Y.; Thomas D. Kim, Highland Park, N.J.; Jeffery Y. Lee, Saugerties, N.Y.; Forrest A. Reiley, Eastham, Mass.

[73] Assignee: International Business Machines Corporation, Armonk, N.Y.

[21] Appl. No.: 697,168

[22] Filed: May 7, 1991

[51] Int. Cl.[5] .............................................. G06F 12/10
[52] U.S. Cl. .............................. 395/400; 364/DIG. 1; 364/DIG. 2
[58] Field of Search ................. 395/400; 364/DIG. 1, 364/DIG. 2, 246.3, 246.4, 966.3, 966.4, 964.33

[56] References Cited

U.S. PATENT DOCUMENTS

| | | | |
|---|---|---|---|
| 4,136,385 | 1/1979 | Gannon et al. | 395/400 |
| 4,188,662 | 2/1980 | Ishibashi | 395/400 |
| 4,293,910 | 10/1981 | Flusche et al. | 395/425 |
| 4,456,954 | 6/1984 | Bullions, III et al. | 395/400 |
| 4,500,952 | 2/1985 | Heller et al. | 395/400 |
| 4,691,281 | 9/1987 | Furui | 395/400 |
| 4,700,291 | 10/1987 | Saito | 395/425 |
| 4,727,484 | 2/1988 | Saito | 395/400 |
| 4,736,293 | 4/1988 | Patrick | 395/425 |
| 4,754,394 | 6/1988 | Brantley, Jr. et al. | 395/400 |
| 4,769,770 | 9/1988 | Miyadera et al. | 395/400 |
| 4,794,521 | 12/1988 | Ziegler et al. | 395/425 |
| 4,849,876 | 7/1989 | Ozawa et al. | 395/400 |
| 4,875,155 | 10/1989 | Iskiyan et al. | 395/425 |
| 4,905,141 | 2/1990 | Brenza | 395/425 |
| 5,099,415 | 3/1992 | Osler et al. | 395/400 |
| 5,111,389 | 5/1992 | McAuliffe et al. | 395/800 |
| 5,133,059 | 7/1992 | Ziegler et al. | 395/425 |

OTHER PUBLICATIONS

Norton et al., "A Class of Boolean Linear Transformations for Conflict Free Power-of-two Stride Access", Proceedings of the 1987 International Conference on Parallel Processing pp. 247-254.

Primary Examiner—Joseph L. Dixon
Assistant Examiner—Jack A. Lane
Attorney, Agent, or Firm—Floyd A. Gonzalez; Robert L. Troike

[57] ABSTRACT

Dynamic address translation structures and procedures are capable of multiple address translations for the same processor in a single cycle. According to one approach, a plurality of directory look aside tables (DLATs) are used to provide multiple address translation. The DLATs are accessed in parallel by separate virtual address generators. To avoid the problem of generating the same address multiple times for each of the DLATs, a generated address for one DLAT may be written to all the DLATs or, alternatively, if a miss occurs in one DLAT, a search is made of the other DLATs before the address is generated. In the former case, an address written to all the DLATs may overwrite an address that will be needed for a future translation by one of the other DLATs. This is avoided in the latter case, but translations in other DLATs are interrupted when a miss occurs in one of the DLATs. This, in turn, may be avoided by employing "shadow" DLATs which are copies of the DLATs. The shadow DLATs are searched when a miss occurs in one of the DLATs thereby avoiding any interruption of translations by the DLATs themselves. Rather than use multiple DLATs, a single interleaved DLAT may be used by multiple address generators.

13 Claims, 13 Drawing Sheets

MULTIPLE VIRTUAL ADDRESS TRANSLATION PER COMPUTER CYCLE

DESCRIPTION

BACKGROUND OF THE INVENTION

1. Field of the Invention

The present invention generally relates to virtual storage mechanisms for data processing systems and, more particularly, to new dynamic lookaside address translation (DLAT) structures and procedures which are capable of generating multiple addresses for a processor in a single cycle.

2. Description of the Prior Art

Virtual storage organization and management for data processing systems are described, for example, by Harvey M. Deitel in *An Introduction to Operating Systems*, Addison-Wesley (1984), by Harold Lorin and Harvey H. Deitel in *Operating Systems*, Addison-Wesley (1981), and by Harold S. Stone in *High-Performance Computer Architecture*, Addison-Wesley (1987). In a virtual storage system, paging is a relocation and address-to-physical-location binding mechanism providing the user of the system with what appears to be a considerably larger memory space than is really available. The key feature of the virtual storage concept is disassociating the addresses referenced in a running process from the addresses available in main storage. The addresses referenced by the running process are called virtual addresses, while the addresses available in main storage are called real addresses. The virtual addresses must be mapped into real addresses as the process executes, and that is the function of the dynamic address translation (DAT) mechanism. One such mechanism employs a directory look aside table (DLAT), sometimes referred to as a translation lookaside buffer (TLB), which stores recent virtual address translations. For virtual addresses stored in the DLAT, the translation process requires only a single or, at most, a couple of machine cycles. For addresses not stored in the DLAT, the DAT process may take from fifteen to sixty cycles.

Translations from the virtual address to the real address must be made to find where the addressed instruction or data is in main memory. This is typically done on a page basis. In fact, the translations stored in the DLAT are actually only page translations, and the last bits of an address are the location in that page, so only the page address must be translated. Often, the addresses are in a specific order as in scientific computing where the addresses are at specific increments in memory. These increments are called a "stride". If all addresses are in incremental order, the stride is one, but if every other address is used, the stride is two, and so forth. This permits easy prediction of future addresses. In scientific or vector computing, an instruction specifies a starting address, the stride and number of operands in the instruction. This allows the address generation to increment the earlier address by the stride to obtain the next address.

In typical applications, a processor generates only one address per cycle. Some processors have more than one address generator going to a DLAT (or TLB), but still only one address is actually translated per cycle. As processors have evolved, there has developed a need to generate and translate more than a single address per cycle. Specifically, the processor requires more than one memory request every cycle to be fully utilized. The requests may be, for example, three separate instructions so that three addresses must be generated every cycle to make the memory requests. What is therefore needed are new dynamic address translation (DAT) structures and procedures which are capable of generating multiple addresses for the same processor in a single cycle.

SUMMARY OF THE INVENTION

It is therefore an object of the present invention to provide new dynamic address translation structures and procedures which are capable of multiple address translations for the same processor in a single cycle.

According to the invention, a plurality of DLATs are used to provide multiple address translation. The DLATs are accessed in parallel by separate virtual address generators. To avoid the problem of generating the same address multiple times fop each of the DLATs, a generated address for one DLAT may be written to all the DLATs or, alternatively, if a miss occurs in one DLAT, a search is made of the other DLATs before the address is generated. In the former case, an address written to all the DLATs may overwrite an address that will be needed for a future translation by one of the other DLATs. This is avoided in the latter case, but translations in other DLATs are interrupted when a miss occurs in one of the DLATs. This, in turn, may be avoided by employing "shadow" DLATs which are copies of the DLATs. The shadow DLATs are searched when a miss occurs in one of the DLATs thereby avoiding any interruption of translations by the DLATs themselves.

Rather than use multiple DLATs, a single interleaved DLAT may be used by multiple address generators. The DLAT is partitioned into several sections, and the last bits of a page address are used to select the section of the DLAT to be addressed for an address translation. Performance may be further enhanced for either the case of multiple DLATs or a single, interleaved DLAT by the use of mode switching. Since translations need be made only when crossing a page boundary, the DLAT is accessed only when a page crossing is detected. This has the further advantage of reducing traffic to the DLAT.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENTS OF THE INVENTION

Figure 1:
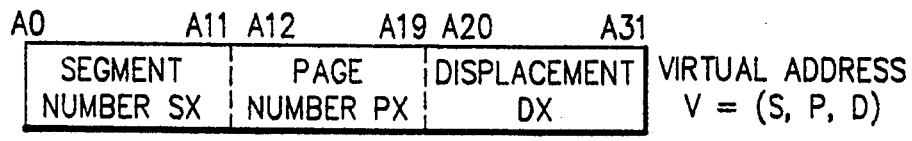
FIG. 1 is a block diagram illustrating the format of a virtual address.

The description which follows uses the term "DLAT" for dynamic look-aside table, but those skilled in the art will understand that this term may be used interchangeably with "TLB" for translation look-aside buffer. For purposes of the following description, a paging/segmentation virtual address system is assumed. In such systems, the virtual address format is as shown in FIG. 1 and comprises s-bits for the segment index (SX), p-bits for the page index (PX), and d-bits for the displacement index (DX). The virtual address may be, for example, 32 bits of which bits A0 through A11 comprise the segment bits, bits A12 through A19 comprise the page bits, and bits A20 through A31 comprise the displacement bits.

Figure 2:
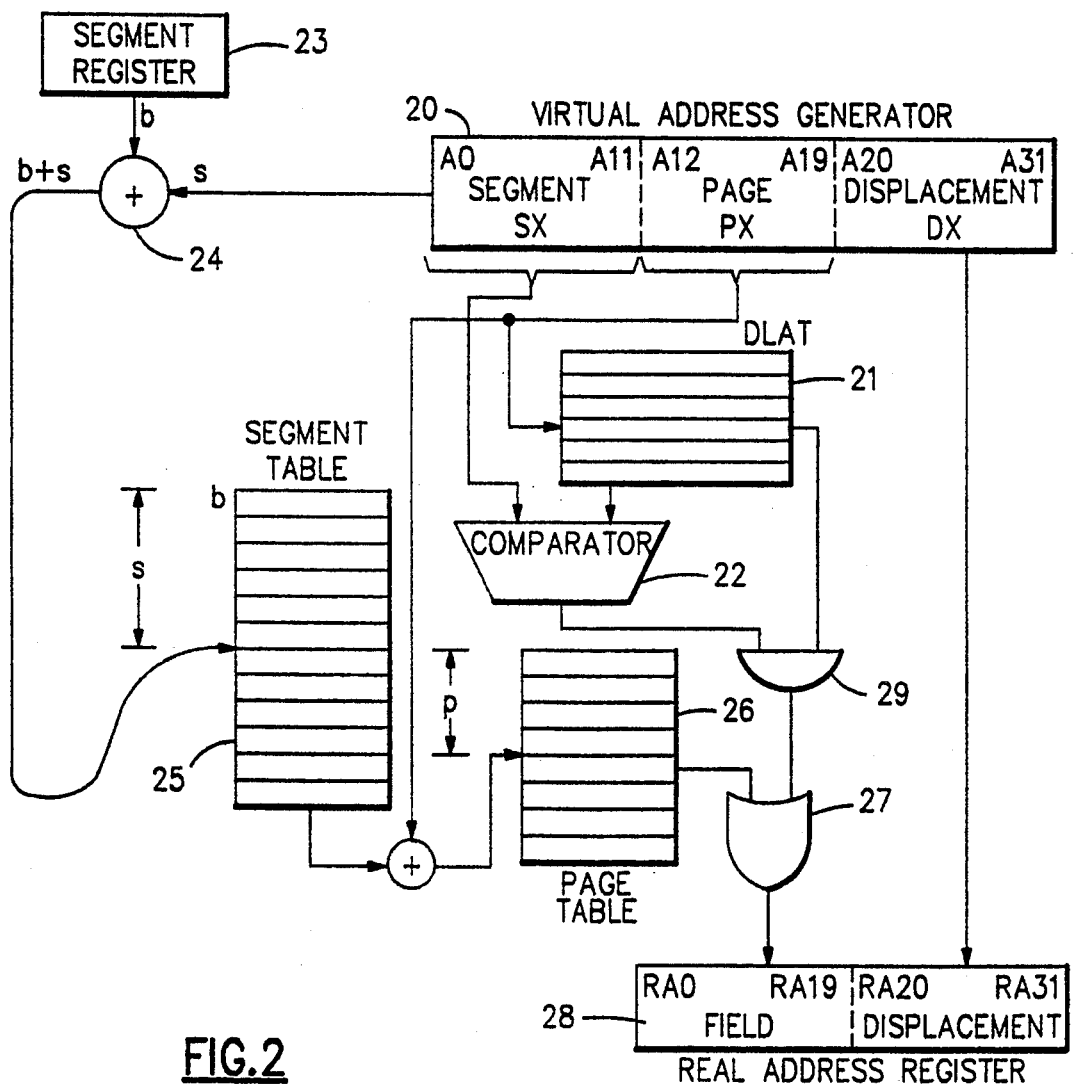
FIG. 2 is a block diagram of a conventional dynamic address translation structure capable of translating (at most) one address per processor cycled

As shown in FIG. 2, the virtual address is generated by address generator 20. The address generator 20 is part of a central processing unit (CPU) (not shown). The most recently referenced pages have entries in the DLAT 21. For a DLAT with 256 congruence classes, bits A12 through A19 of the virtual address are used to address the DLAT. The virtual page identification bits from the addressed entry read out of the DLAT 21 are compared in comparator 22 with bits A1 through A11 of the virtual address. If there is no match, a DLAT miss has occurred. On a DLAT miss, address translation is obtained through, for example, a segment/page table search and placed in the DLAT.

The segment/page table search begins by adding the value in the segment table origin register 23 and the bits A0 to A11 of the virtual address in adder 24 to obtain an index value for the segment map table 25. The entry output from the segment map table 25 is, in turn, used as an index for the page map table 26 entry, there being a separate page map table for each segment. The entry output from the page map table 26 provides the page frame at which the virtual page resides in real storage and is passed by OR gates 27 and concatenated with the displacement bits A20 through A31 of the virtual address generator 20 to form the real address in real address register 28.

On the other hand, if there is a match in the DLAT 21, the comparator 22 enables AND gates 29 which passes the entry output from the DLAT 21 to OR gates 27. In this case, the entry output from the DLAT 21 is the associated real address field which is concatenated to the displacement bits A20 through A31 to form the real storage address in register 28. Obviously, this process of address translation is considerably faster than that of the segment/page table search which occurs on a DLAT miss. The segment/page table search may take fifteen to eighty cycles to complete, whereas a DLAT access can be completed in one cycle.

Normally, most address translation requests are made by a search of the DLAT, and while the segment/page table search takes a greater number of processor cycles than making the translation by means of the DLAT, the segment/page table search is itself not without the possibility of a translation failure. For example, the segment map table search may indicate that the segment is not in primary or main storage, causing the operating system to locate the segment on secondary storage, i.e., a direct access storage device (DASD), create a page table for the segment, and load the appropriate page into primary storage, possibly replacing an existing page in the process.

Even if the segment is in primary storage, the desired page may not be in primary storage, causing the operating system to locate the page on secondary storage and loading the page in primary storage, again possibly replacing an existing page in the process. The process of accessing secondary storage can take up to several hundred processor cycles.

The foregoing description is for a conventional DLAT structure intended to make (at most) one translation per processor cycle. The subject invention modifies this structure so that multiple translations per processor cycle can be made. In the description of the preferred embodiments of the invention, the example of making three translations every cycle is used throughout. It will, of course, be understood that this is merely illustrative, and those skilled in the art will be able to apply the teaching of the invention to any number of translations per cycle for a specific application.

Figure 3:
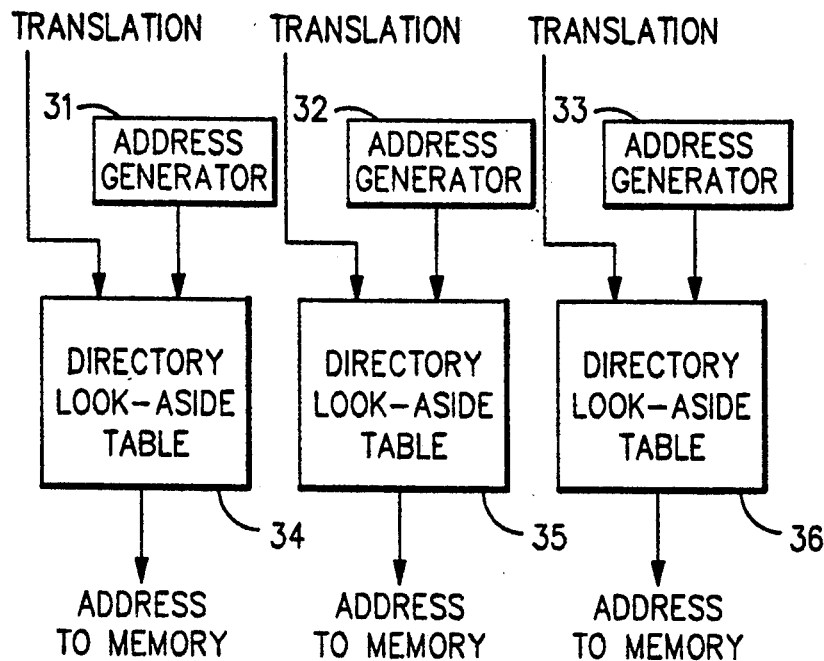
FIG. 3 is a block diagram showing a translation structure in which the DLAT is replicated to provide three independent address generators.
Figure 4:
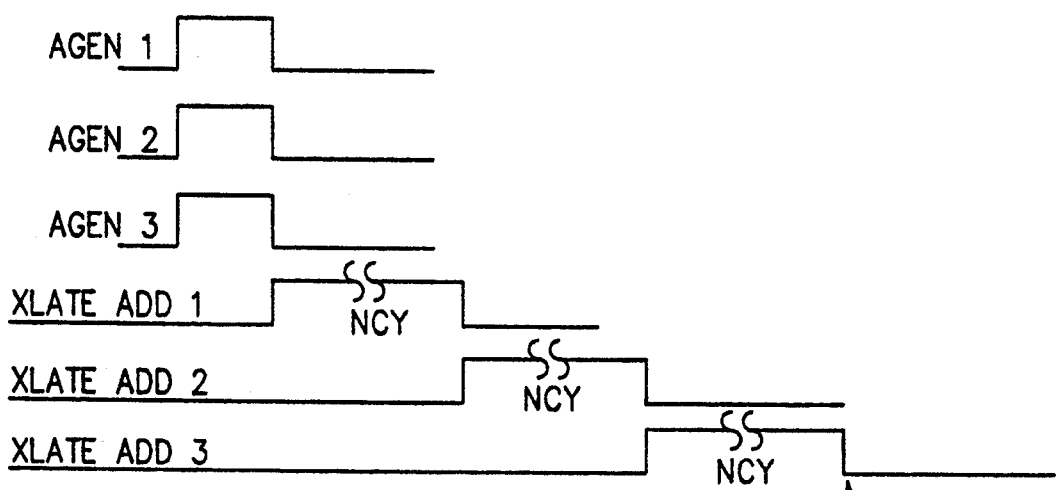
FIG. 4 is a timing diagram illustrating the operation of the translation structure of FIG. 3 when the same address must be written to each of the DLATs.

Referring now to FIG. 3, there is shown a DLAT structure comprising three address generators (AGENs) 31, 32 and 33. Each address generator generates a virtual address and passes the address to THE respective DLAT 34, 35 or 36 for a translation. If the DLAT does not have that translation (a DLAT miss), the address must be generated, as previously described. The main problem with this approach, as illustrated in FIG. 4, is that often the translation will have been made for one DLAT and the same translation will be needed for the others. Thus, for example, the three address generators generate virtual address in parallel. A miss occurs in the first DLAT requiring N cycles to translate. Similarly, misses for the same address occur in the second and third DLATs, each requiring N cycles to translate. Since the same translation might be made three times for the same page, a total of 3N cycles might be required for the translation. Note that the translations must be sequentially performed by the operating system.

Figure 5:
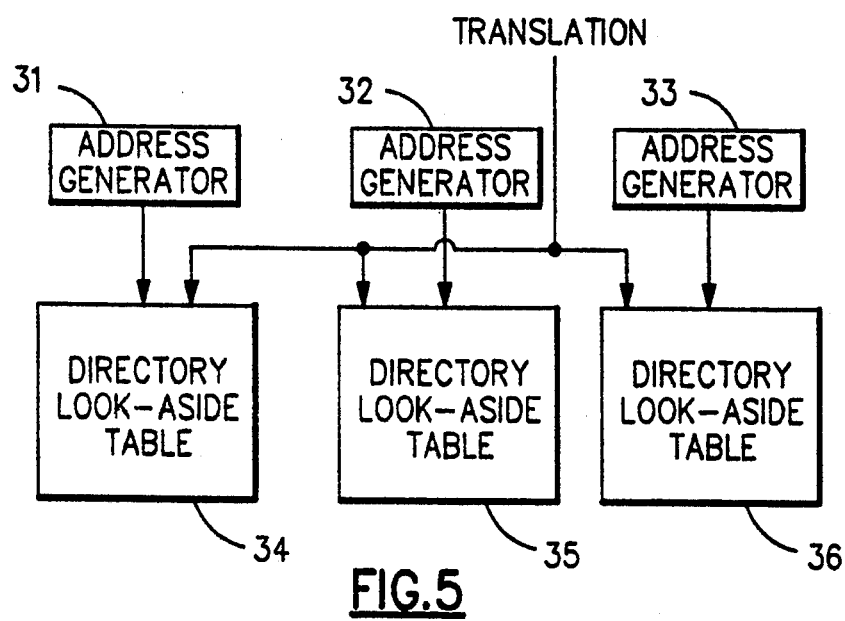
FIG. 5 is a block diagram showing the translation structure of FIG. 3 modified so that generated page addresses are written to all the DLATs.
Figure 6:
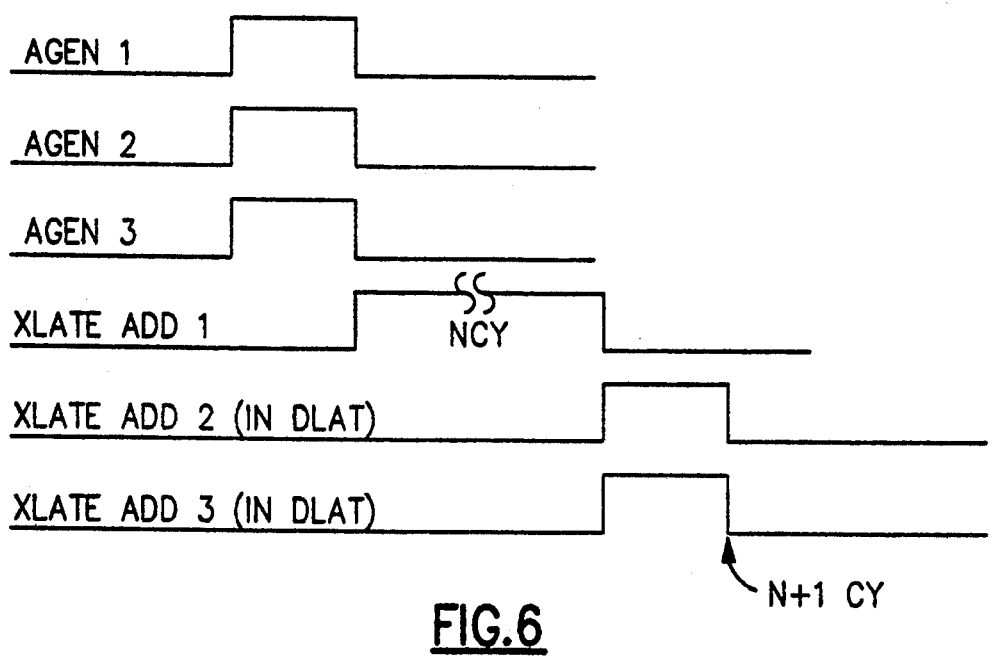
FIG. 6 is a timing diagram illustrating the operation of the translation structure of FIG. 5 indicating the time savings achieved by this structure.
Figure 7:
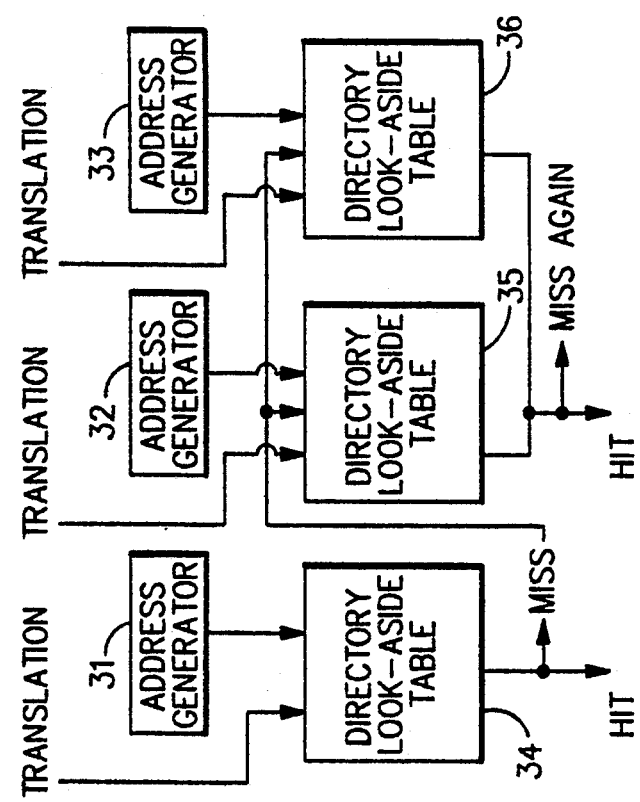
FIG. 7 is a block diagram showing the translation structure of FIG. 3 modified so that a miss in one DLAT causes a search to be made of the other DLATs before a page address is generated.

A solution to making the same translation three times is to write to all three DLATs when a translation is made, as illustrated in FIG. 5. Thus, as indicated in FIG. 6, the translation need only be made once by the operating system and will, thereafter, be available in all the DLATs in only N cycles, This solution, however, risks that a translation could be removed from a DLAT that might be needed in the future. Therefore, rather than write to all three DLATs, another solution is for each of the DLATs to be searched in succession before resorting to a segment/page table search or a translation performed by the operating system. This is shown in FIG. 7, where after a miss occurs DLAT 34, a search is made of DLATs 35 and 36. Only if a miss occurs in all three DLATs is a translation made.

Figure 8:
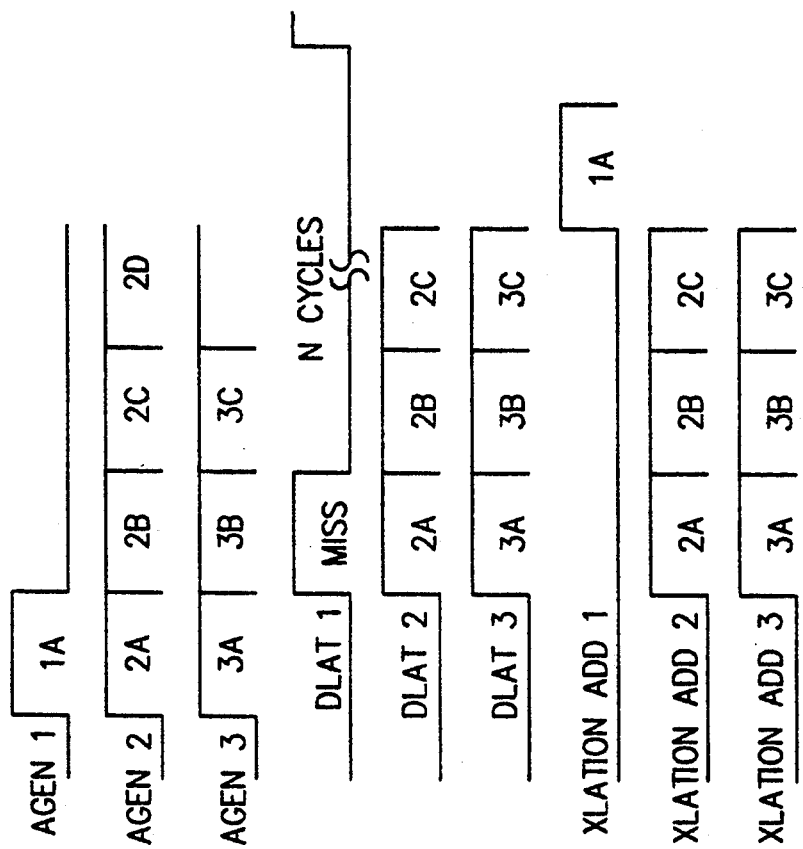
FIG. 8 is a timing diagram illustrating the operation of the translation structure of FIG. 3 when a DLAT miss occurs.
Figure 9:
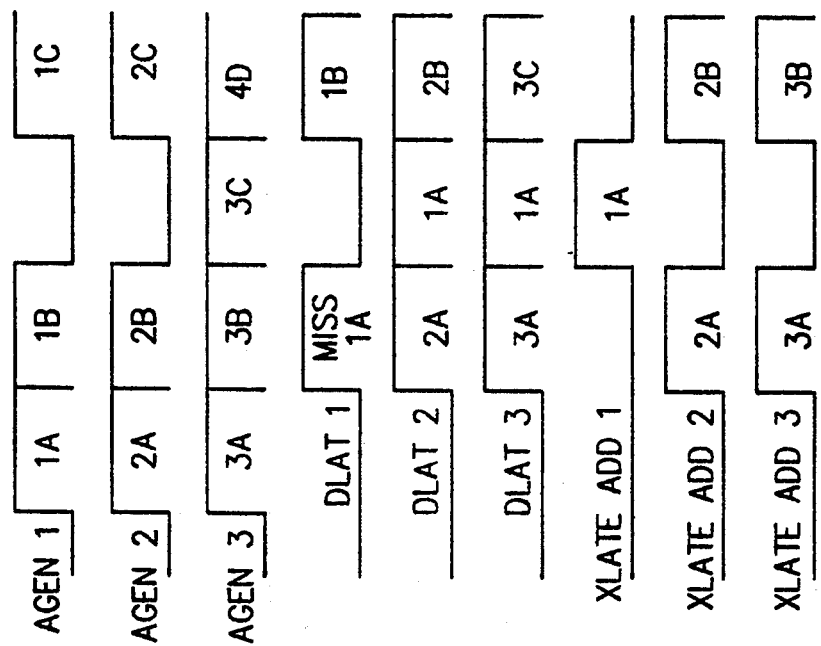
FIG. 9 is a timing diagram illustrating the operation of the translation structure of FIG. 7 where a DLAT miss occurs but a hit is found in one of the other DLATs.

FIG. 8 shows the consequences of a miss in the translation structure of FIG. 3. As described before, N cycles will be required to make the translation when a DLAT miss occurs. On the other hand, if the translation was in DLAT 35, for example, the solution shown in FIG. 7 would provide the translation on the next cycle as illustrated in FIG. 9. However, with the translation structure of FIG. 7, a BLAT miss will interrupt a cycle of translations in the other DLATs 35 and 36, but this is overall a good tradeoff.

Figure 10:
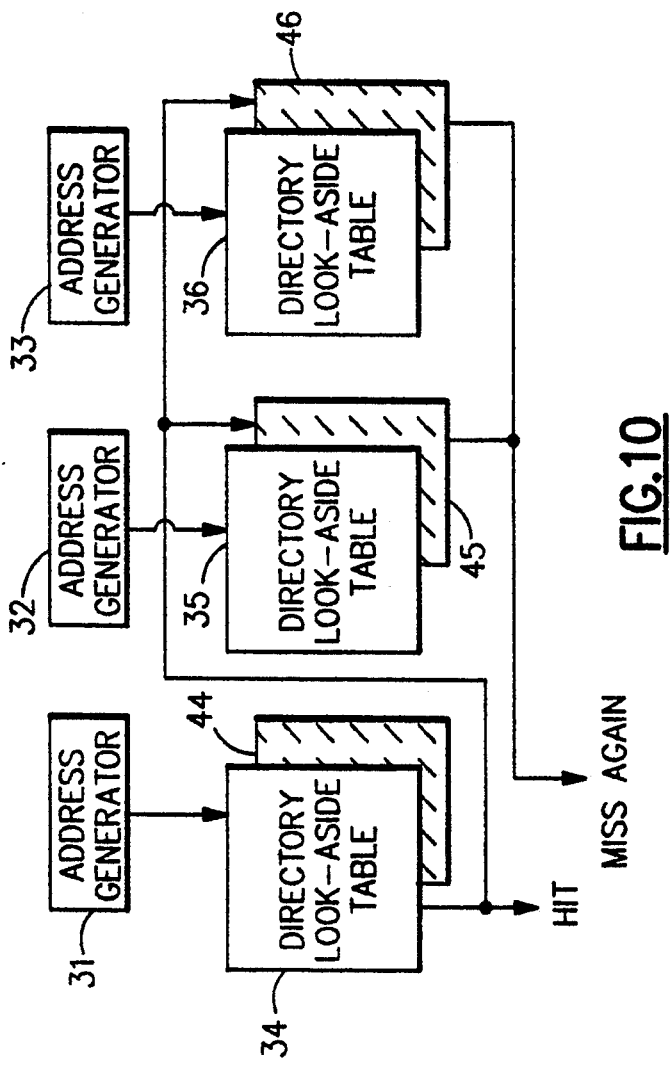
FIG. 10 is a block diagram showing the translation structure of FIG. 7 modified with the addition of "shadow" DLATs.
Figure 11:
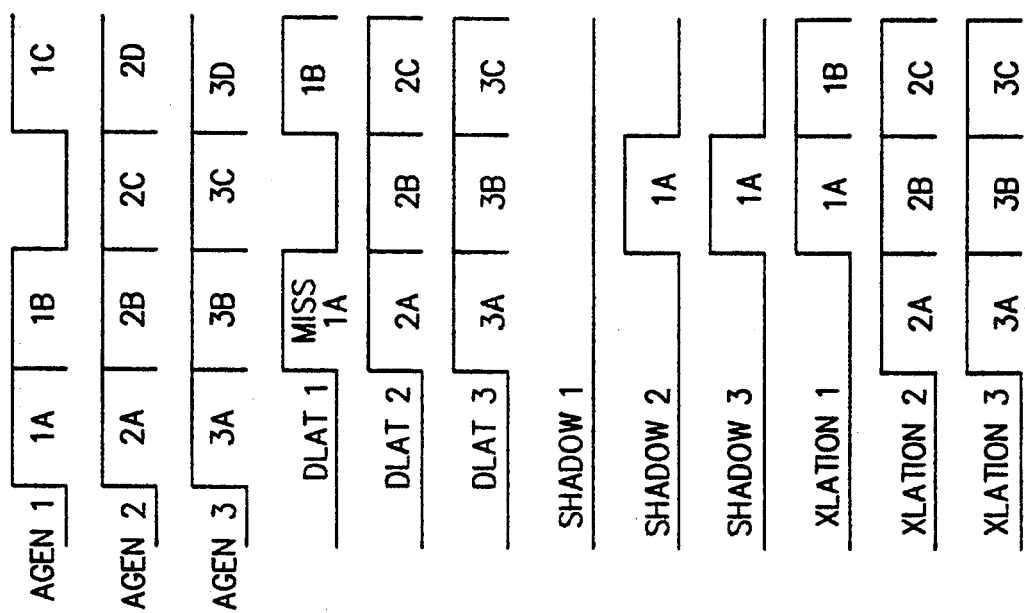
FIG. 11 is a timing diagram illustrating the operation of the translation structure shown in FIG. 10.
Figure 13:
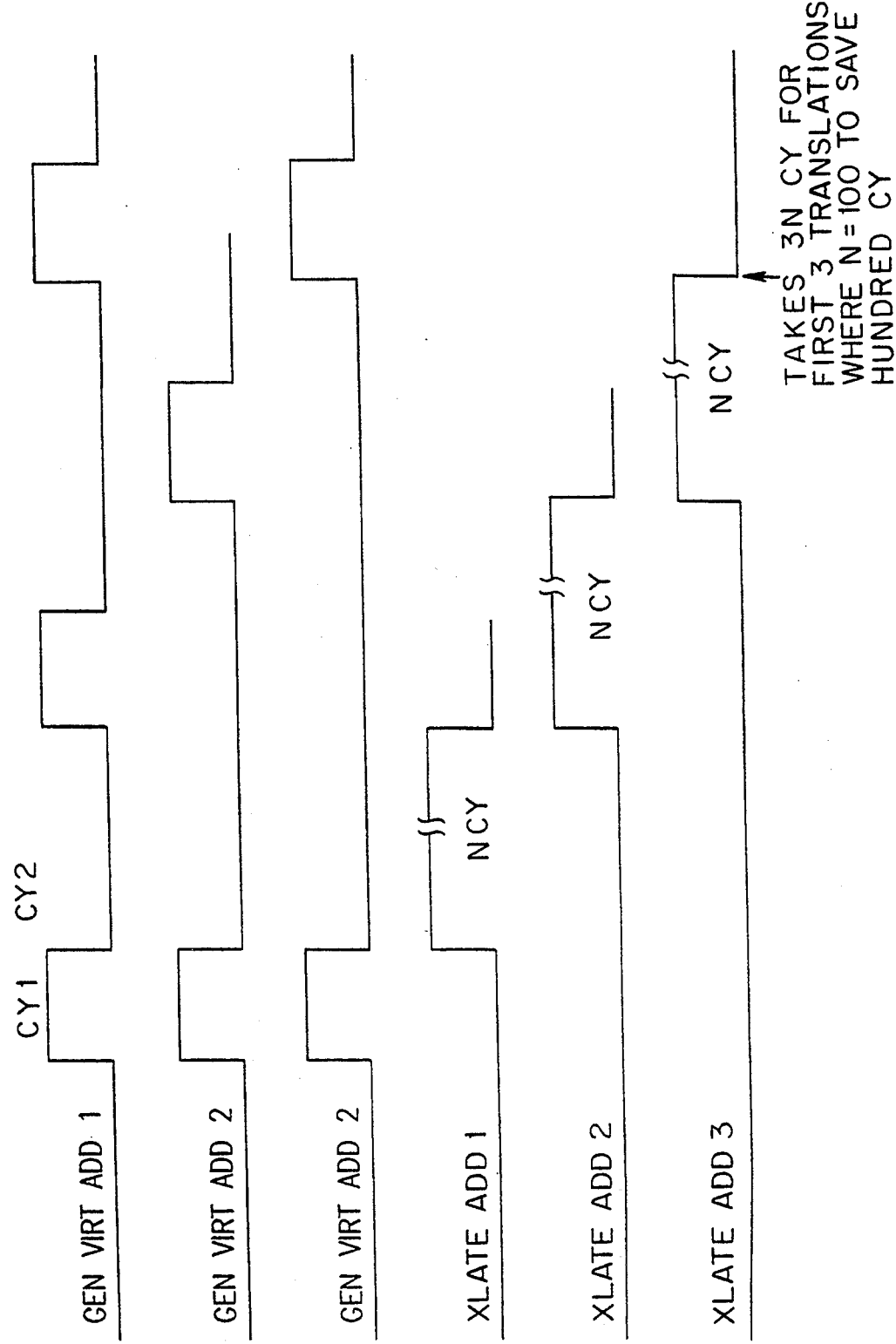
FIG. 13 is a timing diagram showing the operation of the DLAT structure shown in FIG. 3 beginning at a start up condition where the address translation for the page is not in the DLATs.

As indicated, the solution of FIG. 7 has the drawback that searching the other DLATs suspends translations being made by those DLATs. Rather than using the DLATs directly, a modification of the solution shown in FIG. 7 is to use "shadow" copies of the DLATs, as illustrated in FIG. 10. Each of the DLATs 34, 35 and 36 are copied as "shadow" DLATs 44, 45 and 46, respectively. When a DLAT miss occurs, the shadow copies are searched without interrupting the translations being made by the other DLATs. Thus, as illustrated in FIG. 11, even when a DLAT miss occurs, translations continue uninterrupted in the other DLATs and, if a match is found in one of the shadow DLATs, only one additional cycle is required for the translation. This modification of the solution shown in FIG. 7 does require twice as much hardware, but this can be justified where speed is important.

Figure 12:
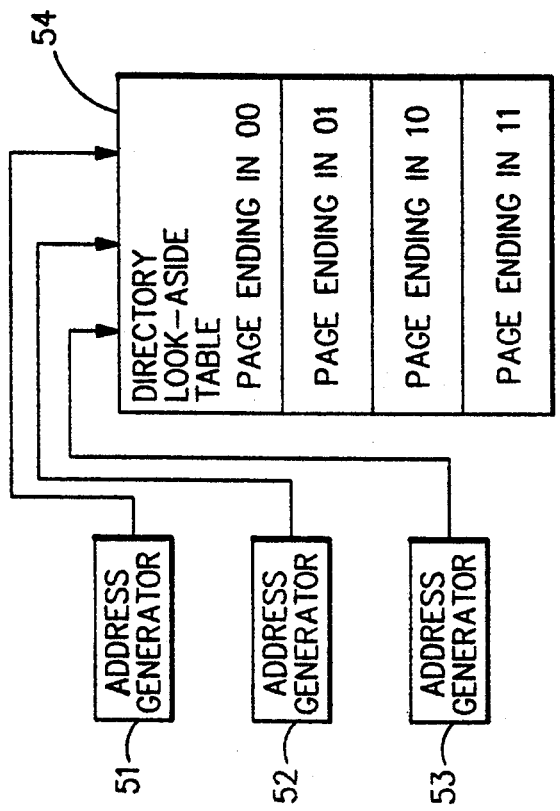
FIG. 12 is a block diagram showing a DLAT structure implemented as an interleaved DLAT.

It is also possible to interleave the DLAT in a similar way as a cache is interleaved. In FIG. 12, three address generators 51, 52 and 53 address a common DLAT 54. The DLAT 54 is partitioned into several sections, four being shown in FIG. 12. The last bits of a page address from the address generators 51, 52 and 53 are used to select the section of the DLAT to be addressed for an address translation. Since the three address generators go to the four-way interleaved DLAT for translation, the DLAT can hold many more translations for a similar amount of hardware as the approaches shown in FIGS. 5, 5, 7, and 10.

Figure 14:
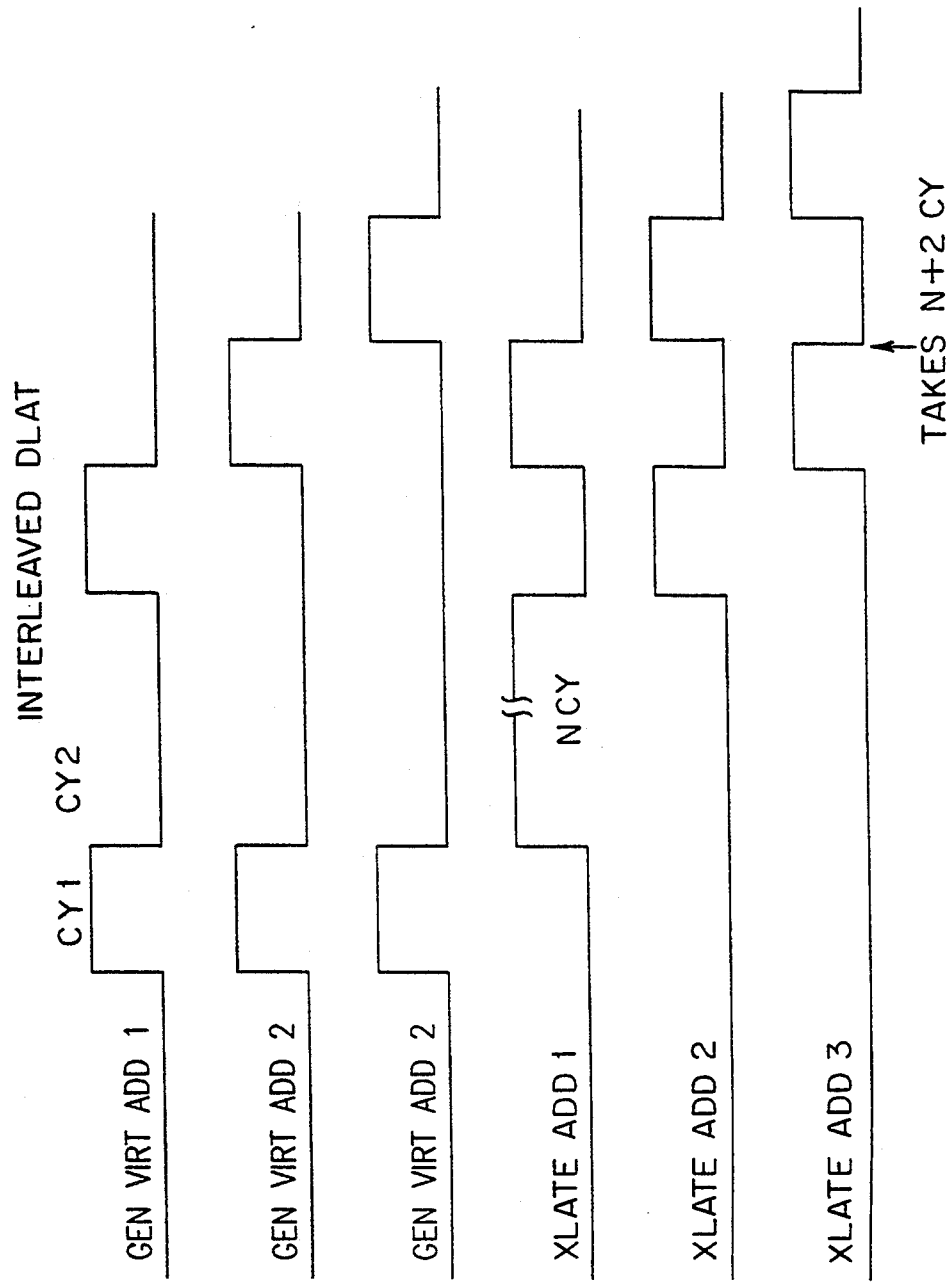
FIG. 14 is a timing diagram showing the operation of the DLAT structure shown in FIG. 12 beginning at a start up condition where the address translation for the page is not in the DLAT.
Figures 15, 16:
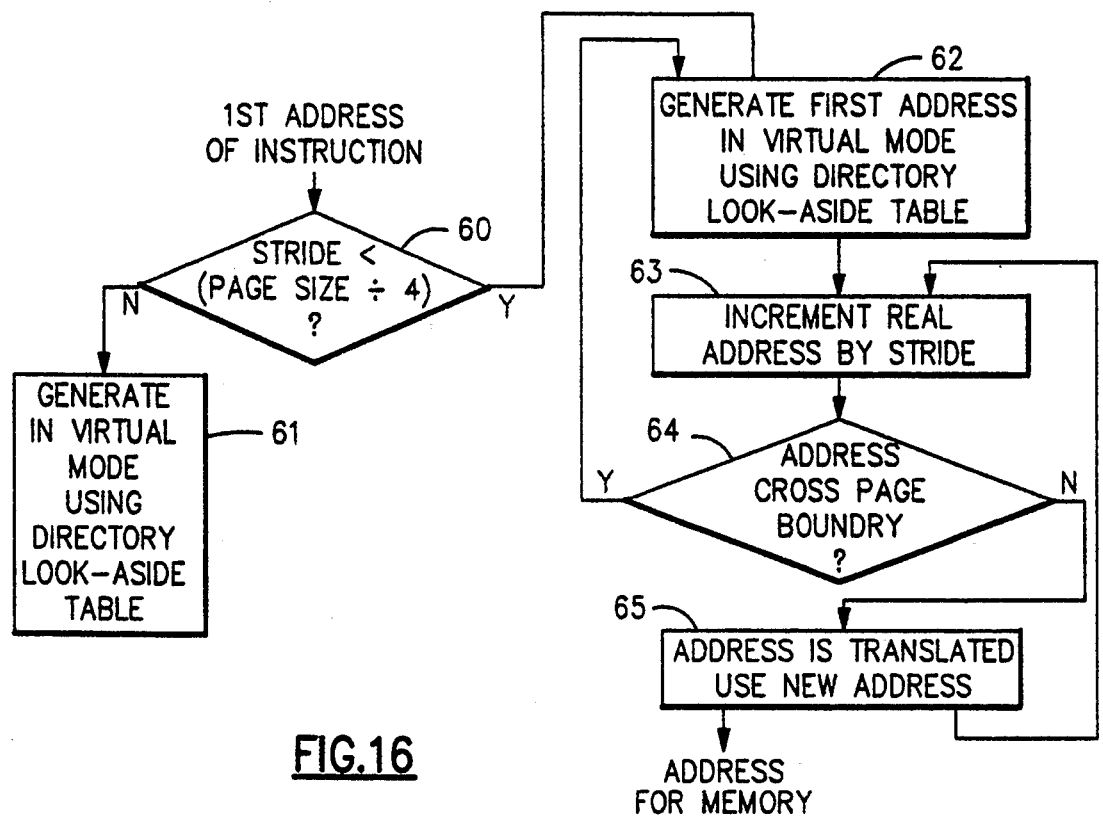
FIG. 15 is a timing diagram showing the operation of the DLAT structure shown in FIG. 12 wherein the stride is one, all translations are the same page, and the translation is in the buffer.
FIG. 16 is a flow diagram illustrating the logic of address generation mode determination according to a further aspect of the invention.

FIG. 15 illustrates the operation of the translation structure of FIG. 5 at start up where the address translations for the pages are not yet in the DLATs. At start up, each address generated first goes to the corresponding DLAT, but since the DLATs have no entries for the addresses, the translations must be made in a serial mode. Again, as in the case illustrated in FIG. 4, 3N cycles are required. In contrast, under the same conditions, only N+2 cycles are required for the translation structure shown in FIG. 12, as illustrated FIG. 14. Assuming that address in generators 51, 52 and 53 all generate addresses in the same page, the page translation is, at start up, not in the DLAT 54. Only one translation must be made, because once the translation is placed in the DLAT 54, the other address generators can access it. Since an application program usually has similar stride values, the interleaved DLAT will generally not have conflicts after the first cycle as the translations are now programmed and offset by one cycle. Thus, the interleaved DLAT can produce three translations per cycle, as illustrated in FIG. 15. FIG. 15 also illustrates a partition page ending in 00, a page ending in 01, a page ending in 10, and a page ending in 11.

The invention also addresses an enhancement to the dynamic address translation mechanism where address generation is done in either real or virtual mode. When done in real mode, the real address of the required data in memory is generated, and no translation is required. In virtual mode, the generated address must be translated. This method uses the fact that these translations only need to be made when the new addresses are in a new page. If the address remains in a page boundary, the real address only needs to be incremented by the stride. When a page boundary crossing is detected, it is then necessary to make a translation from the virtual to new real address. By going to the DLAT only when it is really required, the time required to generate a real address is reduced by removing the cycle required for the DLAT translation. In addition, the traffic to the DLAT is reduced, allowing more than one address generator to go to the same DLAT. For an interleaved DLAT, this procedure reduces conflicts of the address generators going to the same section of the DLAT. This, in turn, increases the speed of address generation or allows more address generators to be hooked to the DLAT with little or no impact to the speed of address generation per generator.

FIG. 16 shows the logic for switching between virtual and real modes. The process begins in decision block 60. If the stride is low enough to expect more than four addresses to be generated in a page, a switch is made to real mode; otherwise, the translation is made in virtual mode using the DLAT in function block 61. If a switch is made to real mode, the DLAT is used to make the first translation in function block 62, then in function block 65, the translated virtual address (real) is incremented by the stride, removing the DLAT from the translation process. After generating each real address by incrementing the translated virtual address, a test is made in decision block 64 to determine if a page boundary has been crossed. If not, the incremented address is used as the translated address in function block 65, and the process loops back to function block 63 where the address is again incremented. When a page crossing is detected, the process loops back to function block 62 to generate the first address in the next page in virtual mode using the DLAT.

Figure 17:
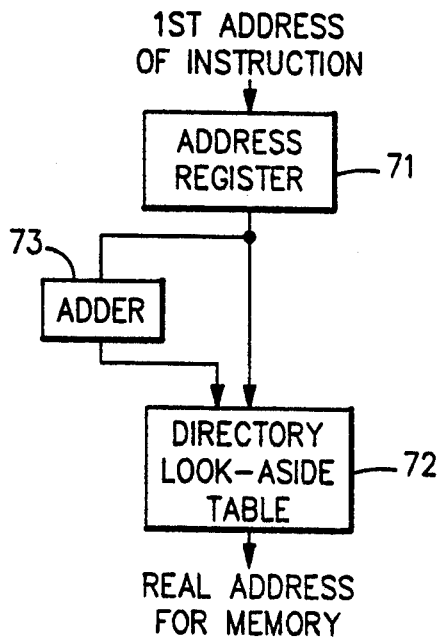
FIG. 17 is a functional block diagram illustrating operation in virtual mode address translation.
Figure 18:
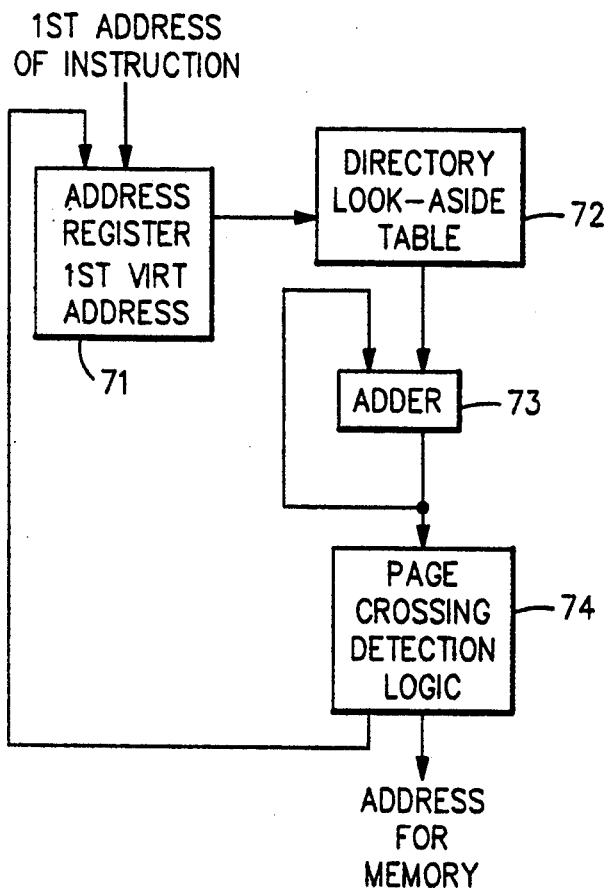
FIG. 18 is a functional block diagram illustrating operation in real mode address translation.

The functions performed in the flow diagram of FIG. 16 are implemented in the hardware illustrated in FIGS. 17 and 18. FIG. 17 represents the hardware configuration in the virtual mode, while FIG. 18 represents the hardware configuration in the real mode. Beginning with FIG. 17, as in the conventional DLAT structure shown in FIG. 2, the first address of a vector instruction is stored in a register 71 and sent to the DLAT 72. The remaining addresses are generated by incrementing the virtual address from the register 71 by the stride in adder 73 and sending the incremented addresses to the DLAT 72. The register 71 and the adder 73 constitute the address generator. In real mode, as shown in FIG. 18, the address register 71 initially searches the DLAT 72 for a match at the beginning of a page. The translation made by the DLAT 72 is incremented by the stride in adder 73, and each real address output from the adder 73 is similarly incremented. Page crossing detection logic 76 puts the address register 71 and the DLAT 72 back into the process for the first address after a page crossing, and then the DLAT 72 is again switched out for the next and subsequent addresses.

Figure 19:
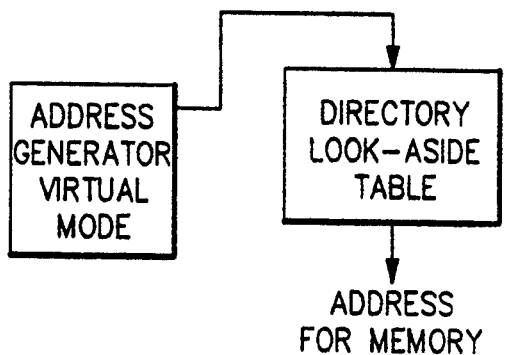
FIG. 19 is a block diagram showing the operation of a single DLAT in virtual mode address translation.
Figure 20:
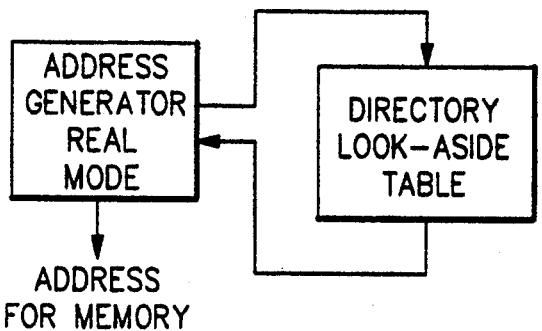
FIG. 20 is a block diagram showing the operation of a single DLAT in real mode address translation.
Figure 21:
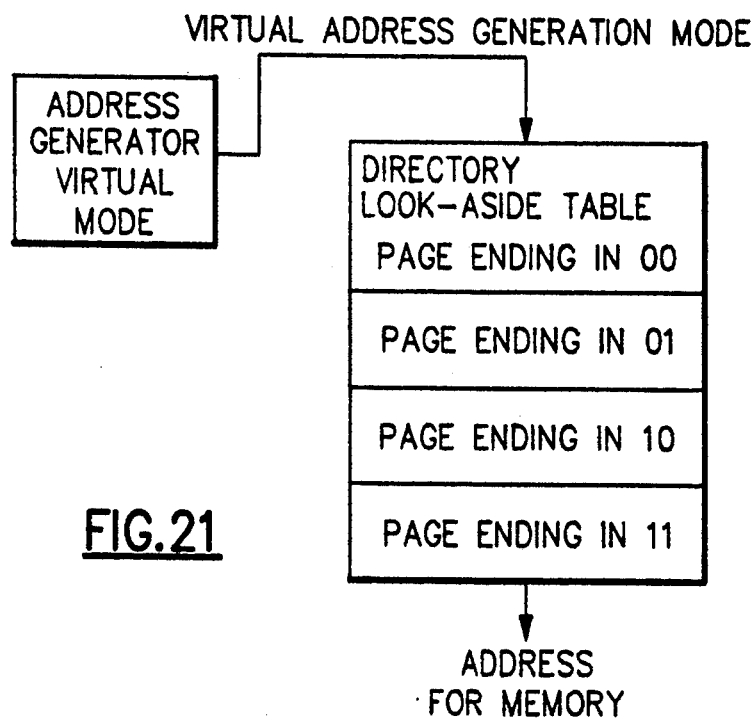
FIG. 21 is a block diagram showing the operation of a single, interleaved DLAT for multiple virtual mode address translations.
Figure 22:
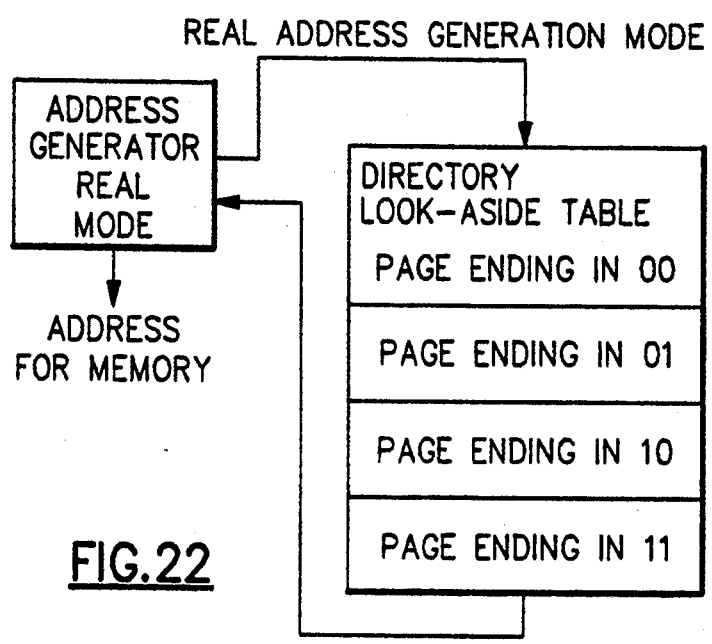
FIG. 22 is a block diagram showing the operation of a single, interleaved DLAT for multiple real mode address translations.

The mode switching can be advantageously applied to conventional DLAT mechanisms, as illustrated in FIG. 2, or applied to multiple translations per cycle structures. For either the case of a single DLAT providing only a single translation per cycle or multiple DLATs providing multiple translations per cycle, the conditions of virtual and real modes are illustrated in FIGS. 19 and 20, respectively. The best performance for hardware overhead, however, is obtained by combining the switched mode operation with a single, interleaved DLAT structure of the type shown in FIG. 12. The conditions of virtual and real modes for this structure are shown in FIGS. 21 and 22, respectively.

Figure 23:
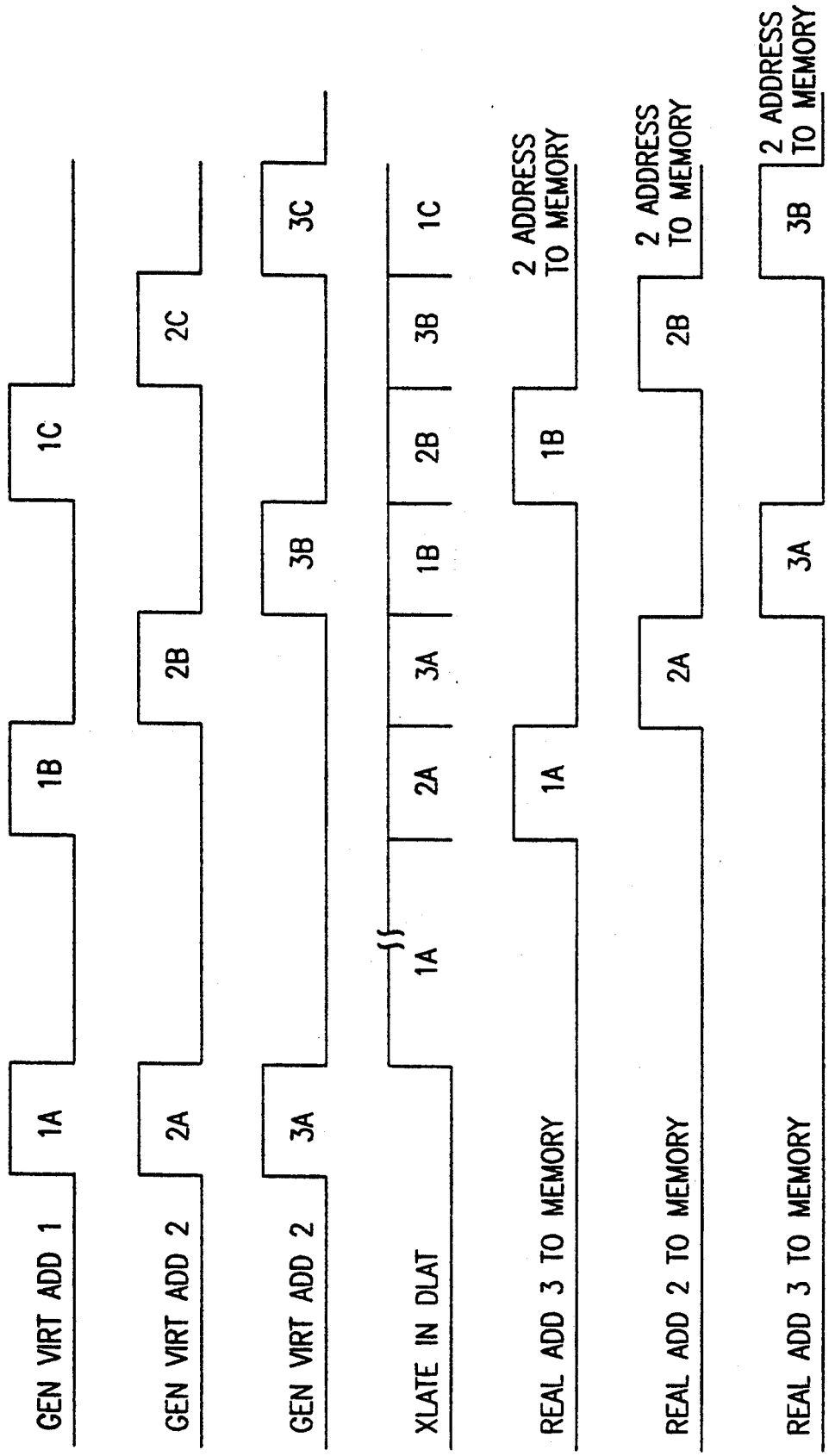
FIG. 23 is a timing diagram illustrating the operation of multiple, non-interleaved DLATs when no real mode switching is available.
Figure 24:
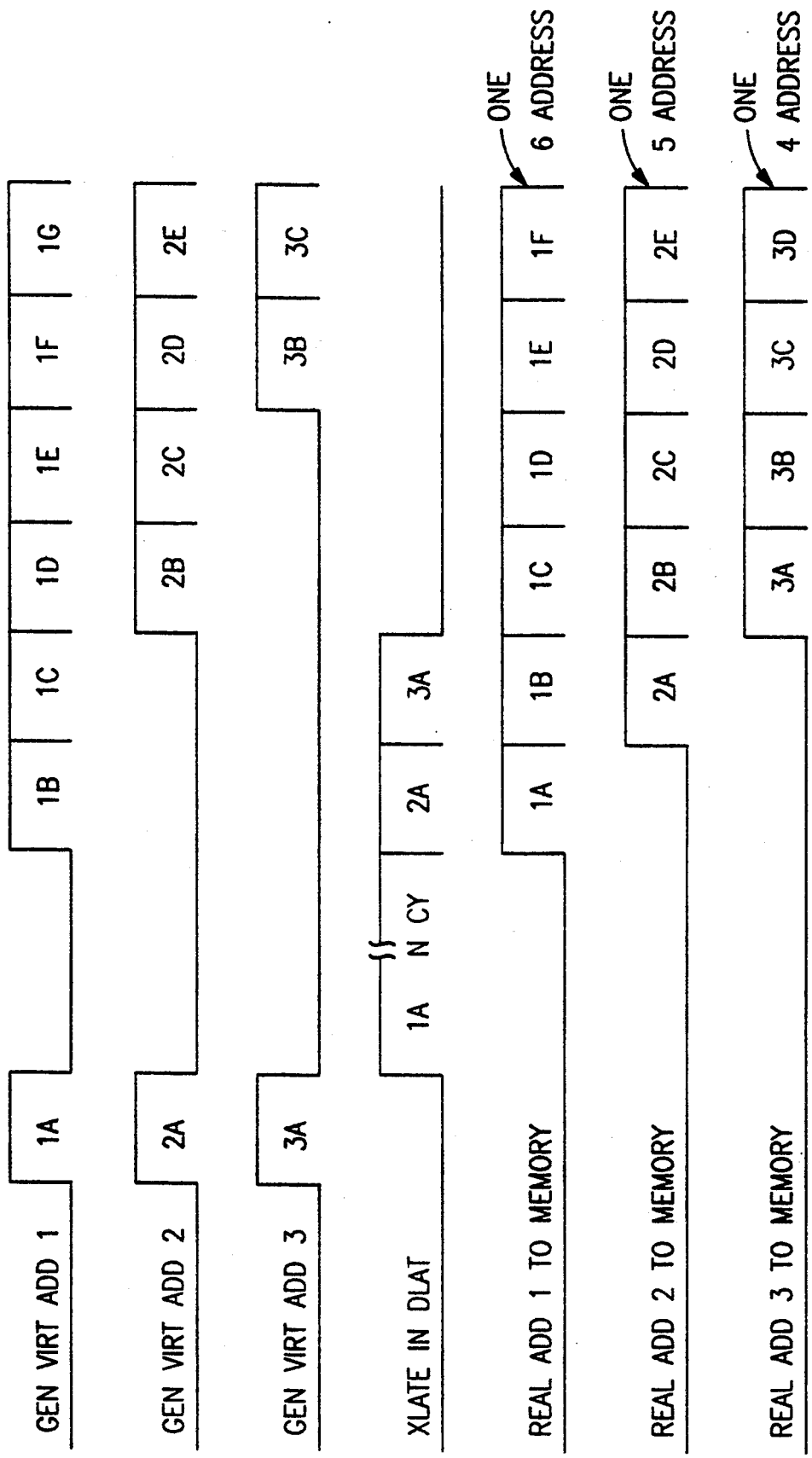
FIG. 24 is a timing diagram illustrating the improved operation of multiple, non-interleaved DLATs when real mode switching is available for the case of stride one and all addresses in the same page.

The advantage of mode switching for multiple address translations per cycle are illustrated in FIGS. 23 and 26. In FIG. 23, a stride of one with all addresses being on the same page is assumed but real mode switching is not available, requiring all addresses to be made in virtual mode. In FIG. 24 real mode switching is available. By making the first translation in virtual mode and then switching to real mode, it is possible to generate fifteen addresses as opposed to only six. This is much more effective if the addresses are in separate pages as a first address generator in real mode can continue to generate addresses while the address for a second address generator is being translated in N cycles. If only virtual mode were available, the DLAT would be waiting N cycles before it could take a new address.

While the invention has been described in terms of a several preferred embodiments, those skilled in the art will recognize that the invention can be practiced with modifications within the spirit and scope of the appended claims.

Having thus described our invention, what we claim as new and desire to secure by Letters Patent is as follows:

1. An address translation mechanism for a virtual storage system in a data processing system which supports multiple virtual address translations per computer cycle, said address translation mechanism comprising:
   means for storing a plurality of virtual addresses to be translated, said virtual addresses including segment index bits, page index bits and displacement index bits;
   dynamic look-aside table means for storing virtual-to-real translation information; and
   accessing means responsive to said page index bits of said virtual addresses for accessing during a computer cycle said dynamic look-aside table means to simultaneously generate real addresses for each of said virtual addresses,
   wherein an instruction specifies a starting address, a stride and a number of operands in the instruction, the stride being an increment between successive addresses, said mechanism further comprising:
   mode switching means for determining when the stride is less than a predetermined fraction of a page size and for switching between a real mode of translation and a virtual mode of translation; and
   incrementing means operable in said real mode for incrementing a first real address multiple times within a page boundary to generate real addresses.

2. The address translation mechanism recited in claim 1 wherein said dynamic look-aside table means comprises a plurality of tables, one for each virtual address to be translated per computer cycle.

3. The address translation mechanism recited in claim 2 further comprising means for writing a translated address to each of said plurality of tables.

4. The address translation mechanism recited in claim 2 wherein said accessing means includes means for accessing each of said tables in succession until a match is found or until all of said tables have been searched.

5. The address translation mechanism recited in claim 2 further comprising storage means for storing copies of each of said tables, said accessing means first accessing a table corresponding to one of said virtual addresses and, if no match is found, thereafter accessing the copies of each of the remaining ones of said tables in succession until a match is found or until all of said copies have been searched.

6. The address translation mechanism recited in claim 1 wherein said dynamic look-aside table means comprises a single, interleaved table partitioned into a plurality of sections, said accessing means selecting sections of said table corresponding to said virtual addresses to be translated.

7. The address translation mechanism recited in claim 1 wherein said incrementing means is operable in said virtual mode for incrementing virtual addresses to generate virtual addresses to be translated.

8. The address translation mechanism recited in claim 1 wherein said dynamic look-aside table means comprises a single, interleaved table partitioned into a plurality of sections, said accessing means selecting sections of said table corresponding to said virtual addresses to be translated.

9. The address translation mechanism recited in claim 8 wherein said incrementing means is operable in said virtual mode of translation for incrementing virtual addresses to generate virtual addresses to be translated.

10. The address translation mechanism recited in claim 1 wherein said dynamic look-aside table means comprises a plurality of tables, one for each virtual address to be translated per computer cycle.

11. The address translation mechanism recited in claim 10 further comprising means for writing a translated address to each of said plurality of tables.

12. The address translation mechanism recited in claim 10 wherein said accessing means includes means for accessing each of said tables in succession until a match is found or until all of said tables have been searched.

13. The address translation mechanism recited in claim 10 further comprising storage means for storing copies of each of said tables, said accessing means first accessing a table corresponding to one of said virtual addresses and, if no match is found, thereafter accessing the copies of each of the remaining tables in succession until a match is found or until all of said copies have been searched.

* * * * *